(12) United States Patent
Pierce et al.

(10) Patent No.: US 7,004,724 B2
(45) Date of Patent: Feb. 28, 2006

(54) METHOD AND APPARATUS FOR WIND TURBINE ROTOR LOAD CONTROL BASED ON SHAFT RADIAL DISPLACEMENT

(75) Inventors: Kirk G. Pierce, Tehachapi, CA (US); David Lawrence LeMieux, Tehachapi, CA (US); Ralph W. Blakemore, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 10/620,485

(22) Filed: Jul. 15, 2003

(65) Prior Publication Data
US 2004/0151575 A1    Aug. 5, 2004

Related U.S. Application Data

(63) Continuation-in-part of application No. 10/357,522, filed on Feb. 3, 2003.

(51) Int. Cl.
*B63H 3/01* (2006.01)
(52) U.S. Cl. .............................. 416/61; 416/43; 415/26; 415/48; 415/118
(58) Field of Classification Search .................. 416/61, 416/43, 40, 41, 44; 415/118, 26, 49, 48
See application file for complete search history.

(56) References Cited

U.S. PATENT DOCUMENTS

| | | | |
|---|---|---|---|
| 4,298,313 A | 11/1981 | Hohenemser et al. | |
| 4,420,692 A | 12/1983 | Kos et al. | |
| 4,435,647 A | 3/1984 | Harner | |
| 4,495,423 A | 1/1985 | Rogers | |
| 4,613,762 A | 9/1986 | Soderholm | |
| 5,140,856 A * | 8/1992 | Larsen | 416/144 |
| 5,225,712 A | 7/1993 | Erdman | |
| 6,361,275 B1 * | 3/2002 | Wobben | 416/33 |

FOREIGN PATENT DOCUMENTS

WO    WO 01/33075 A1    5/2001

OTHER PUBLICATIONS

P. Caselitz et al., "Reduction of Fatigue Loads on Wind Energy Converters by Advanced Control Methods," European Wind Energy Conference, Oct. 1997, pp. 1-4, Dublin Castle, Ireland.

(Continued)

*Primary Examiner*—Edward K. Look
*Assistant Examiner*—Igor Kershteyn
(74) *Attorney, Agent, or Firm*—Blakely, Sokoloff, Taylor & Zafman LLP (57) ABSTRACT

Vertical and horizontal wind shears, yaw misalignment and/or turbulence act together to produce asymmetric loading across a wind turbine rotor. The resultant load produces bending moments in the blades that are reacted through the hub and subsequently to the main shaft. As a result, the main shaft may be radially displaced from its at rest positions. The amount of radial displacement is measured using two or more sensors. The output signals from the sensors are used to determine the magnitude and/or the orientation of the resultant rotor load. This information is used to affect the blade pitch change or other action with similar system effect to reduce the asymmetric load and thereby reduce fatigue and loading on various turbine components.

21 Claims, 6 Drawing Sheets

OTHER PUBLICATIONS

N. Kelley et al., "The NREL Large-Scale Turbine Inflow and Response Experiment-Preliminary Results," National Wind Technology Center, National Renewable Energy Laboratory, pp. 412-426, #AIAA-2002-0064, Golden, Colorado, USA.

David Lawrence LeMieux, "Rotor Blade Fatigue Reduction on Wind Turbines Using Pitch Control," A Thesis submitted to the Department of General Engineering, Montana Tech of The University of Montana, May 2001, pp. i-109, Butte, Montana, USA.

* cited by examiner

METHOD AND APPARATUS FOR WIND TURBINE ROTOR LOAD CONTROL BASED ON SHAFT RADIAL DISPLACEMENT

The present U.S. Patent application is a continuation-in-part of application Ser. No. 10/357,522 filed Feb. 3, 2003 by Kirk Pierce and David L. LeMieux entitled "WIND TURBINE ROTOR LOAD CONTROL BASED ON COMPONENT DISPLACEMENT"

FIELD

The invention relates to wind turbines. More particularly, the invention relates to load control based on shaft radial displacement.

BACKGROUND

Utility grade wind turbines (i.e., wind turbines designed to provide electrical power to a utility grid) can have large rotors (e.g., 30 or more meters in diameter). Asymmetric loading across these rotors occurs due to vertical and horizontal wind shears, yaw misalignment and turbulence. These asymmetric loads contribute to extreme loads and the quantity of fatigue cycles on the rotor blades and other wind turbine components.

Various techniques have been developed to reduce fatigue caused by asymmetric loading of rotors. For example, in "Reduction of Fatigue Loads on Wind Energy Converters by Advanced Control Methods" by P. Caselitz, et al., European Wind Energy Conference, October 1997, Dublin Castle, Ireland, a technique for active damping of tower oscillations is disclosed. However, the techniques disclosed therein are based on tilt and yaw of the tower, which provides only general information about the loads on individual wind turbine components.

An additional technique is disclosed in an International Application Published under the Patent Cooperation Treaty (PCT) entitled "METHOD OF CONTROLLING THE OPERATION OF A WIND TURBINE AND WIND TURBINE FOR USE IN SAID METHOD" (Publication WO 10/33075, PCT application number PCT/DK99/00595), published May 10, 2001. The PCT application discloses a turbine controller that controls the pitch of wind turbine blades based on the mechanical loads placed on the blades. However, the control system of the PCT application is complex because multiple blade sensor outputs must be evaluated constantly.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for control of wind turbine loads based on shaft radial displacement are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Vertical and horizontal wind shears, yaw misalignment and/or turbulence act together to produce asymmetric loading across a wind turbine rotor. The resultant load produces bending moments in the blades that are reacted through the hub and subsequently to the low-speed shaft. As a result, the main shaft is displaced from its at rest position. Although shaft radial displacement can be measured using one sensor, two or more approximately orthogonally positioned sensors are required to resolve the radial displacement into a form necessary for control purposes. The output signals from the sensors can then be used to determine the magnitude and/or the orientation of the resultant rotor load and mitigate the load or the asymmetric nature of the load by, for example, controlling blade pitch.

The blade pitch change needed to reduce the load and thereby reduce fatigue and loading on various turbine components can be determined from the output signals generated by the sensors. A Parks DQ transformation, a bias estimation method calculation and/or other control techniques can be used to calculate the pitch increment for each rotor blade to reduce overall and/or asymmetric rotor loading. Fatigue and extreme loads of the rotor blades and other turbine components can be reduced.

Determination of the main shaft radial displacement can be obtained from sensors that measure displacement or strain of the shaft using sensor technologies based on acoustic, optical, magnetic, capacitive or inductive field effects. In one embodiment, proximity sensors are used to measure the main shaft radial displacement. In one embodiment a minimum of two sensors measuring main shaft radial displacement are used. As described in greater detail below, additional and/or different sensors can also be used.

Figure 1:
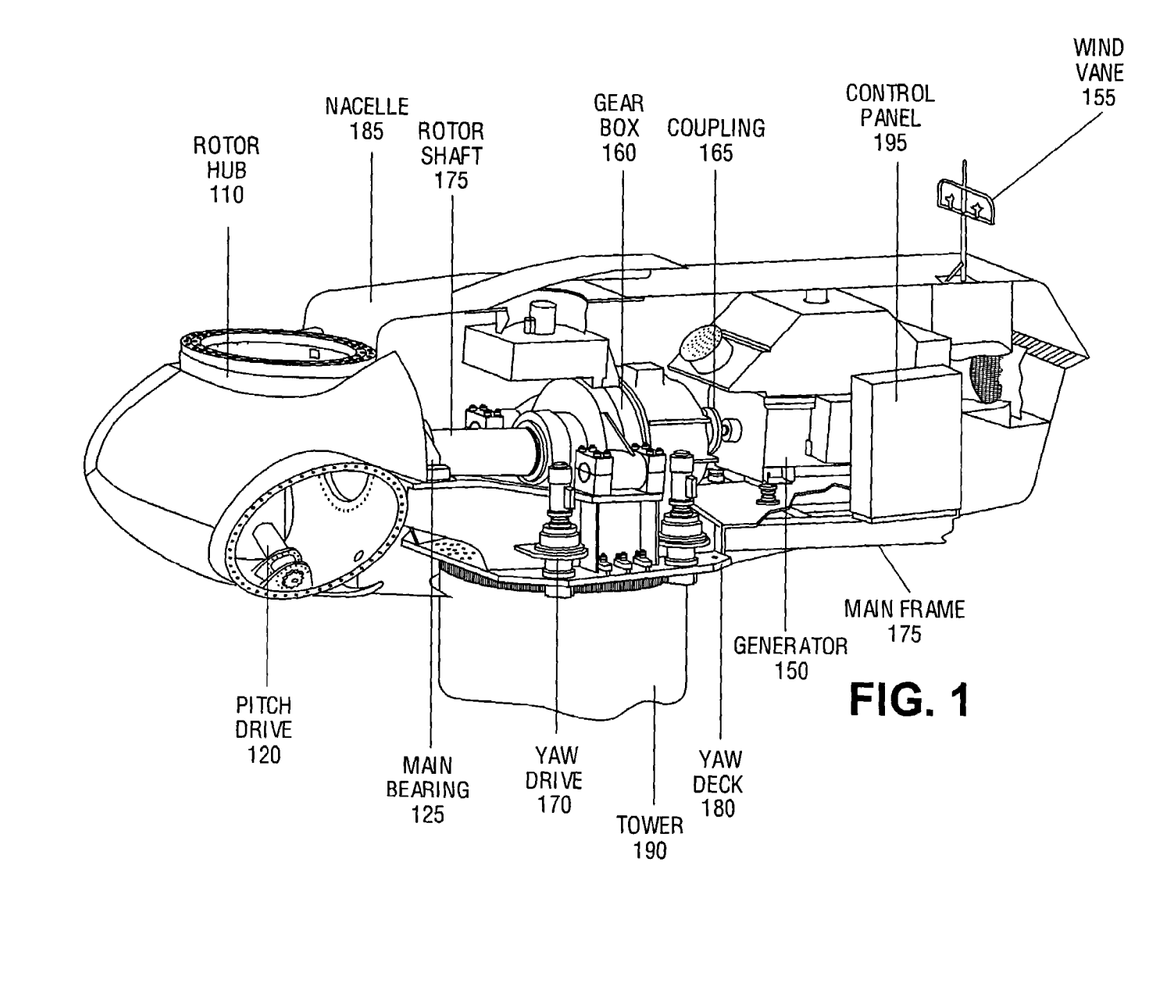
FIG. 1 is one embodiment of wind turbine components.

FIG. 1 is one embodiment of wind turbine components. The components of FIG. 1, except for hub 110, are housed in a nacelle 185 atop tower 190. The height of tower 190 can be selected based on factors and conditions known in the art. In one embodiment, multiple microcontrollers (e.g., within control panel 195) are used for overall system monitoring and control including pitch and speed regulation, high-speed shaft and yaw brake application, yaw and pump motor application and fault monitoring. Alternative distributed or centralized control architectures can also be used.

In one embodiment the control system provides control signals to variable blade pitch controller 120 to control the pitch of blades (not shown in FIG. 1) that drive hub 110 as a result of wind. In one embodiment, hub 110 receives three blades; however, any number of blades can be used. In one embodiment, the pitch of the blades can be individually controlled by blade pitch controller 120. Hub 110 and the turbine blades combine to form a wind turbine rotor.

The drive train of the wind turbine includes rotor shaft 175 connected to hub 110 and a gear box 160 that, in one embodiment, utilizes a dual path geometry to drive a high speed shaft enclosed within the gear box. The high speed shaft is used to drive generator 150. In one embodiment, rotor torque is transmitted through coupling 165. Any type of generator, for example, a wound rotor induction generator can be used in the wind turbine of FIG. 1.

Yaw drive 170 and yaw deck 180 provide a yaw orientation system for the wind turbine. In one embodiment, the yaw system is electrically operated and controlled by the control system based on information received from a wind vane 155 mounted on the nacelle. In one embodiment, the yaw system is mounted on a flange provided atop of tower 190.

As described in greater detail below, one or more proximity sensors are positioned to detect a deflection of main shaft 175 from a predetermined at rest position. Using data from the sensors a turbine controller (not shown in FIG. 1) can determine the loads on the blades that caused the deflection detected by the sensors. With this information, the turbine controller can cause the pitch of the blades to be changed to reduce the load on the blades or to reduce the asymmetrical nature of the loads (i.e., to cause a more symmetric load on the rotor).

Figure 2:
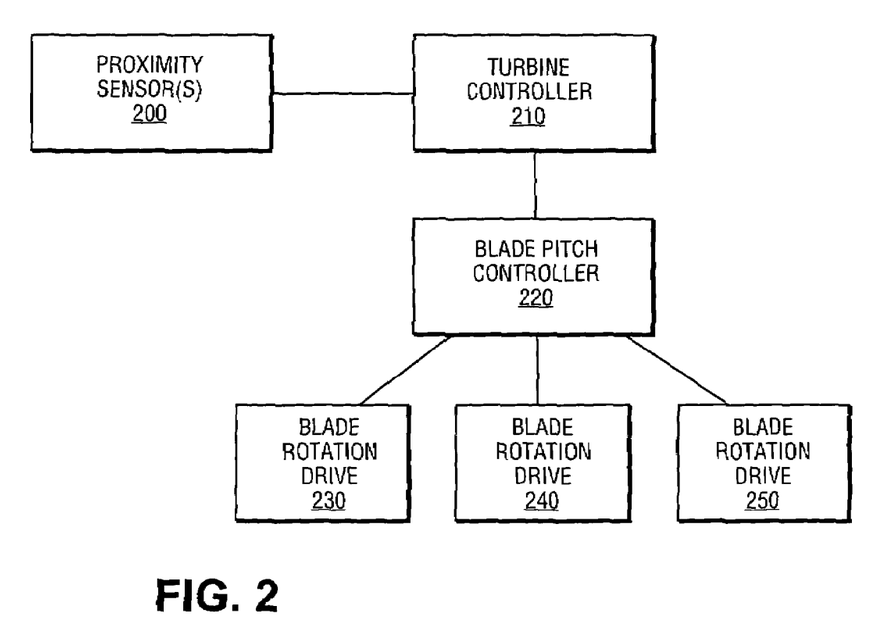
FIG. 2 is a block diagram of one embodiment of a system to control blade pitch based on sensor measurements.

FIG. 2 is a block diagram of one embodiment of a system to control blade pitch based on sensor measurements. Proximity sensor(s) 200 generate signals in response to displacement of wind turbine components, for example, the main shaft. Turbine controller 210 is coupled to sensor(s) 200 to receive the signals generated by sensor(s) 200. Turbine controller 210 analyzes the signals to determine the forces that caused the deflection.

In one embodiment, turbine controller 210 includes a processor that receives output signals (either analog or digital signals) from sensor(s) 200. The processor can be, for example, a general purpose processor that executes instructions, a hardwired control circuit, or a combination of a general purpose processor and hardwired circuitry. In response to the signals received from sensor(s) 200, turbine controller generates control signals that are transmitted to blade pitch controller 220.

Blade pitch controller 220 is coupled to one or more blade rotation drives (e.g., 230, 240, 250) that control the pitch of the blades of the wind turbine. By varying the pitch of the blades, the magnitude and/or the duration of loads placed on the turbine can be reduced, thereby improving the overall performance of the wind turbine.

Asymmetric loading across a wind turbine rotor can occur due to vertical and horizontal wind shears, yaw misalignment, turbulence, etc. Asymmetric loads across the rotor are manifested as deflections or strains at the main shaft. Thus, measurement of shaft displacement, for example, radial displacement, can be used to calculate the magnitude of asymmetric loading.

The calculated magnitude can be used to determine a blade pitch command for each rotor blade of the wind turbine to reduce the asymmetric load acting on the rotor shaft, and being transmitted to other turbine components. A coordinate transformation, bias estimation method and/or other control techniques can be used to calculate the pitch angle for each rotor blade to reduce the overall asymmetric rotor loading. Fatigue and extreme loads of the rotor blades and other turbine components can be reduced.

In one embodiment, shaft radial displacement is determined by analysis of signals from sensors measuring displacement of the shaft using sensor technologies based on acoustic, optical, magnetic, eddy current, capacitive or inductive field or other technology. In one embodiment, proximity sensors are used to measure displacement relative to a low deflection reference frame, for example, a main frame or housing of the low speed shaft main bearing.

Figure 3:
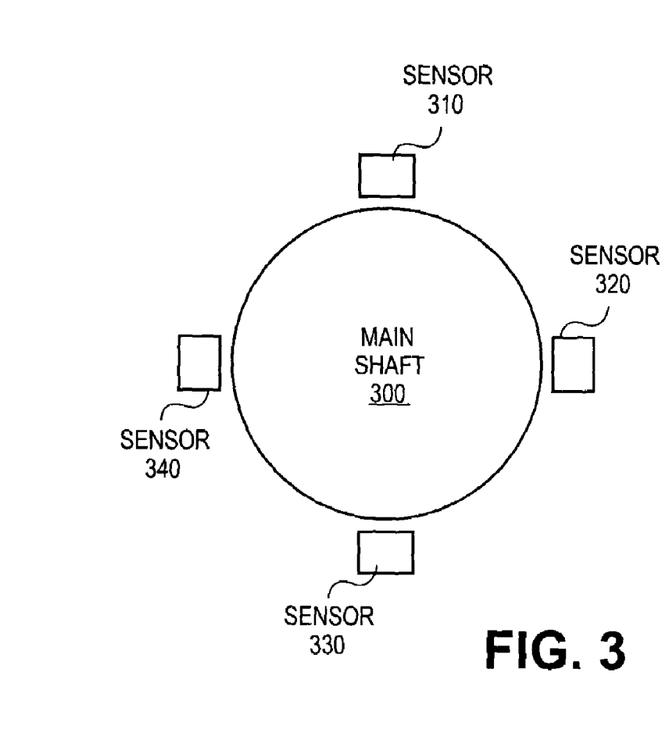
FIG. 3 is an end view of a main shaft having four sensors in a first configuration.
Figure 4:
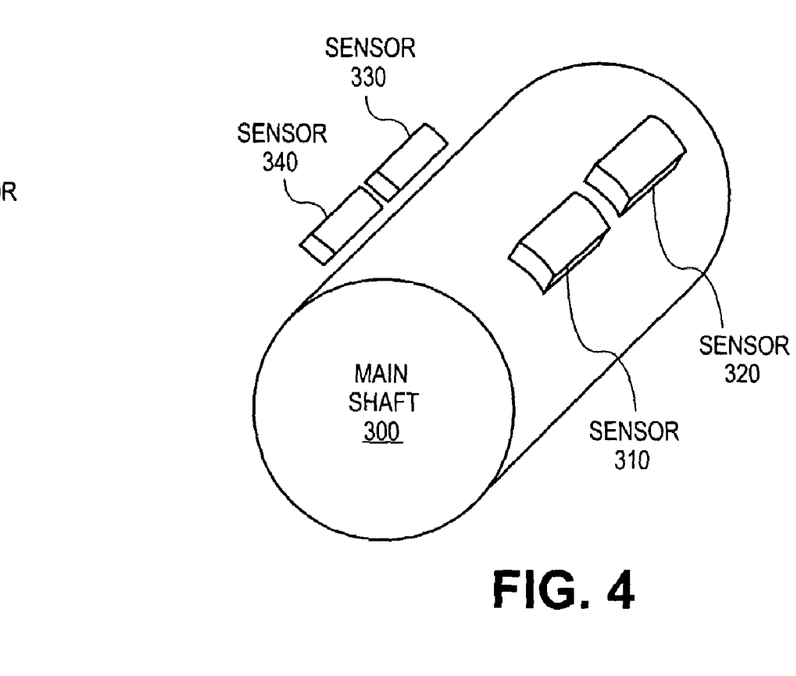
FIG. 4 is a perspective view of a main shaft having four sensors in a second configuration.
Figure 5:
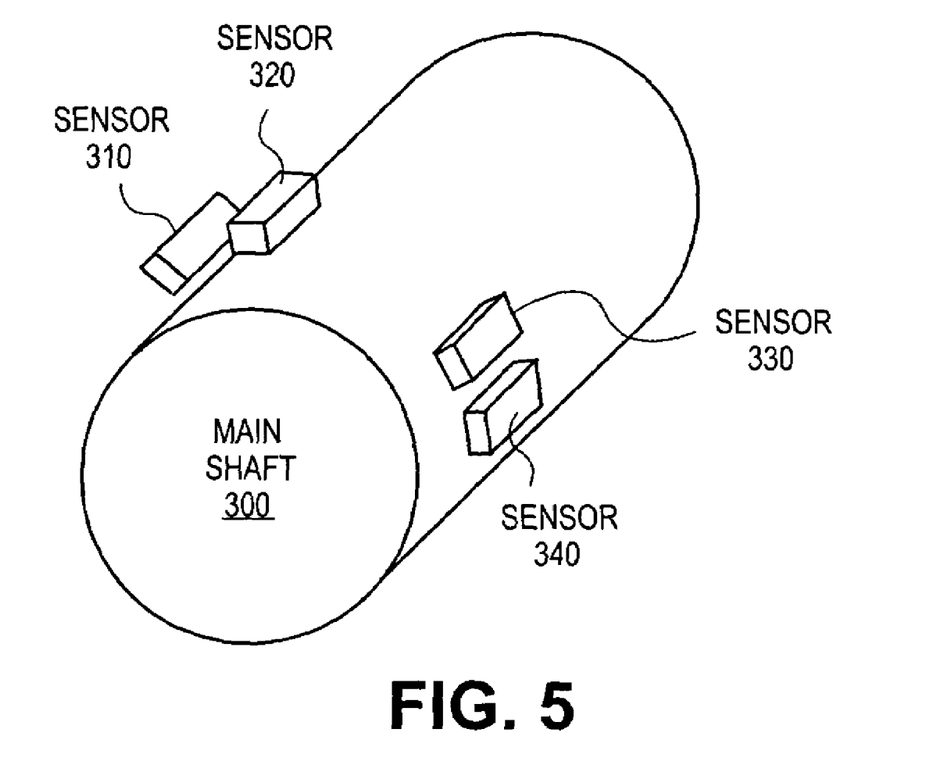
FIG. 5 is a perspective view of a main shaft having four sensors in a third configuration.

A minimum of two sensors are used to measure shaft radial displacement; however, for redundancy, sensor diagnostic purposes, or other reasons, more than two sensors can be used. FIG. 3 illustrates an embodiment with four sensors with each sensor (310, 320, 330 and 340) positioned 90° apart around the circumference of the surface of main shaft 300. FIG. 4 illustrates an embodiment with four sensors positioned in pairs located 90° apart around main shaft 300. FIG. 5 illustrates an alternate embodiment with four sensors positioned in pairs located 90° apart around main shaft 300. In one embodiment, the sensors are located as far as possible from the gearbox. In an alternate embodiment, the sensors are located approximately midway between gearbox 160 and main bearing 125.

Figure 6:
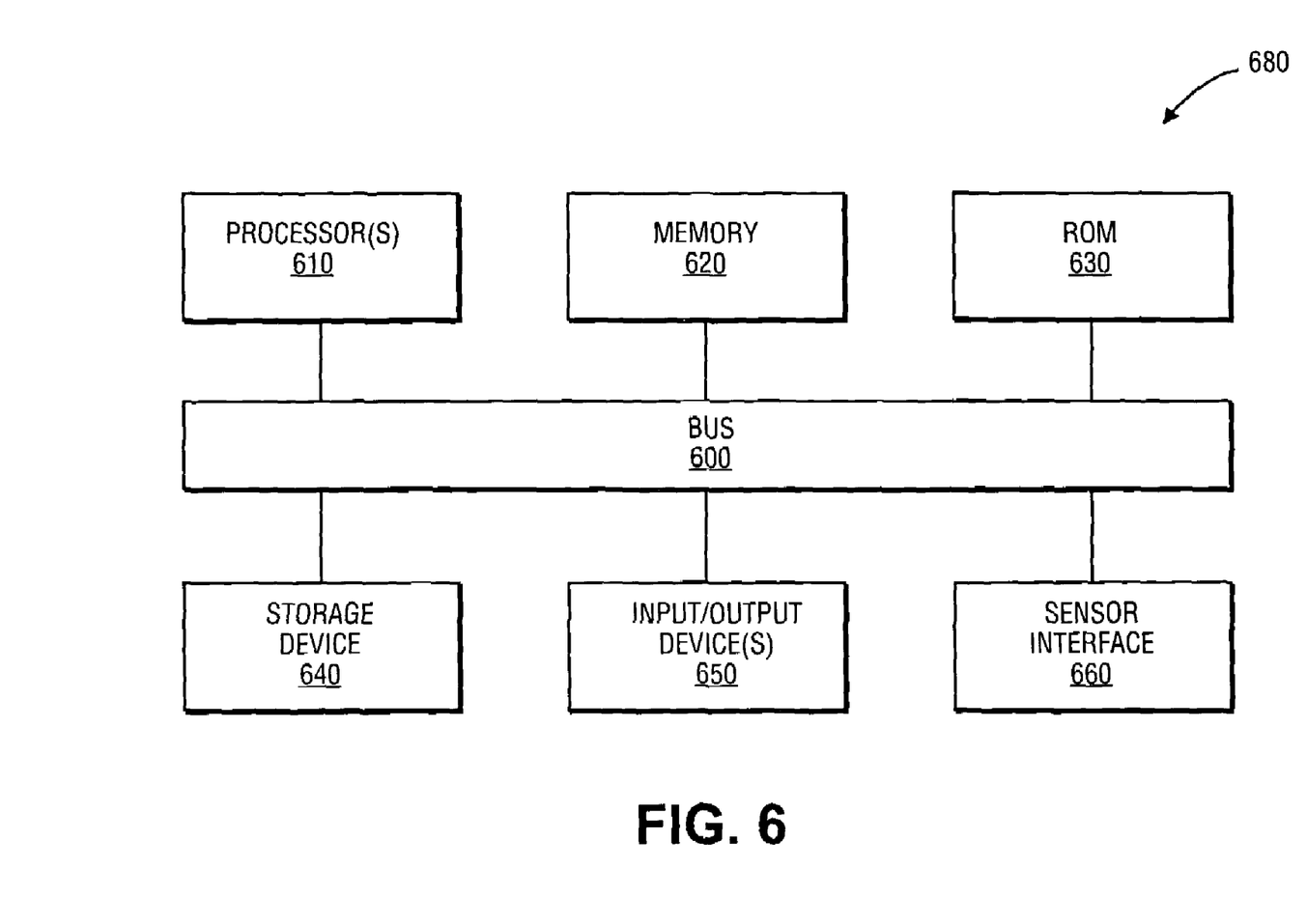
FIG. 6 is a block diagram of one embodiment of a turbine controller.

FIG. 6 is a block diagram of one embodiment of a turbine controller.

Turbine controller 680 includes bus 600 or other communication device to communicate information, and processor 610 coupled to bus 600 to process information. While turbine controller 680 is illustrated with a single processor, turbine controller 680 can include multiple processors and/or co-processors. Turbine controller 680 further includes random access memory (RAM) 620 or other dynamic storage device 640 (referred to as memory), coupled to bus 600 to store information and instructions to be executed by processor 610. Memory 620 also can be used to store temporary variables or other intermediate information during execution of instructions by processor 610.

Turbine controller 680 can also include read only memory (ROM) and/or other static storage device 630 coupled to bus 600 to store static information and instructions for processor 610. Data storage device 640 is coupled to bus 600 to store information and instructions. Input/output device(s) 650 can include any device known in the art to provide input data to turbine controller 680 and/or receive output data from turbine controller 680.

Instructions are provided to memory from a storage device, such as magnetic disk, a read-only memory (ROM) integrated circuit, CD-ROM, DVD, via a remote connection that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Sensor interface 660 is an interface that allows turbine controller 680 to communicate with one or more sensors within a wind turbine. For example, sensor interface 660 can be coupled to receive output signals from one or more sensors that detect deflection of wind turbine components as described above. Sensor interface 660 can be, for example, an analog-to-digital converter that converts an analog voltage signal generated by the sensors to a multi-bit digital signal to be used by processor(s) 610.

Processor(s) 610 can then analyze the data and transmit data to a blade pitch controller through input/output device(s) 650 to cause the blade pitch controller to change the pitch of one or more blades of the wind turbine. Processor(s) 610 can also take other actions in response to the signals from the sensors. For example, processor(s) 610 can cause a brake, either mechanical or aerodynamically achieved via blade pitch, to be applied to stop or slow rotation of the hub or of a rotating shaft.

Figure 7:
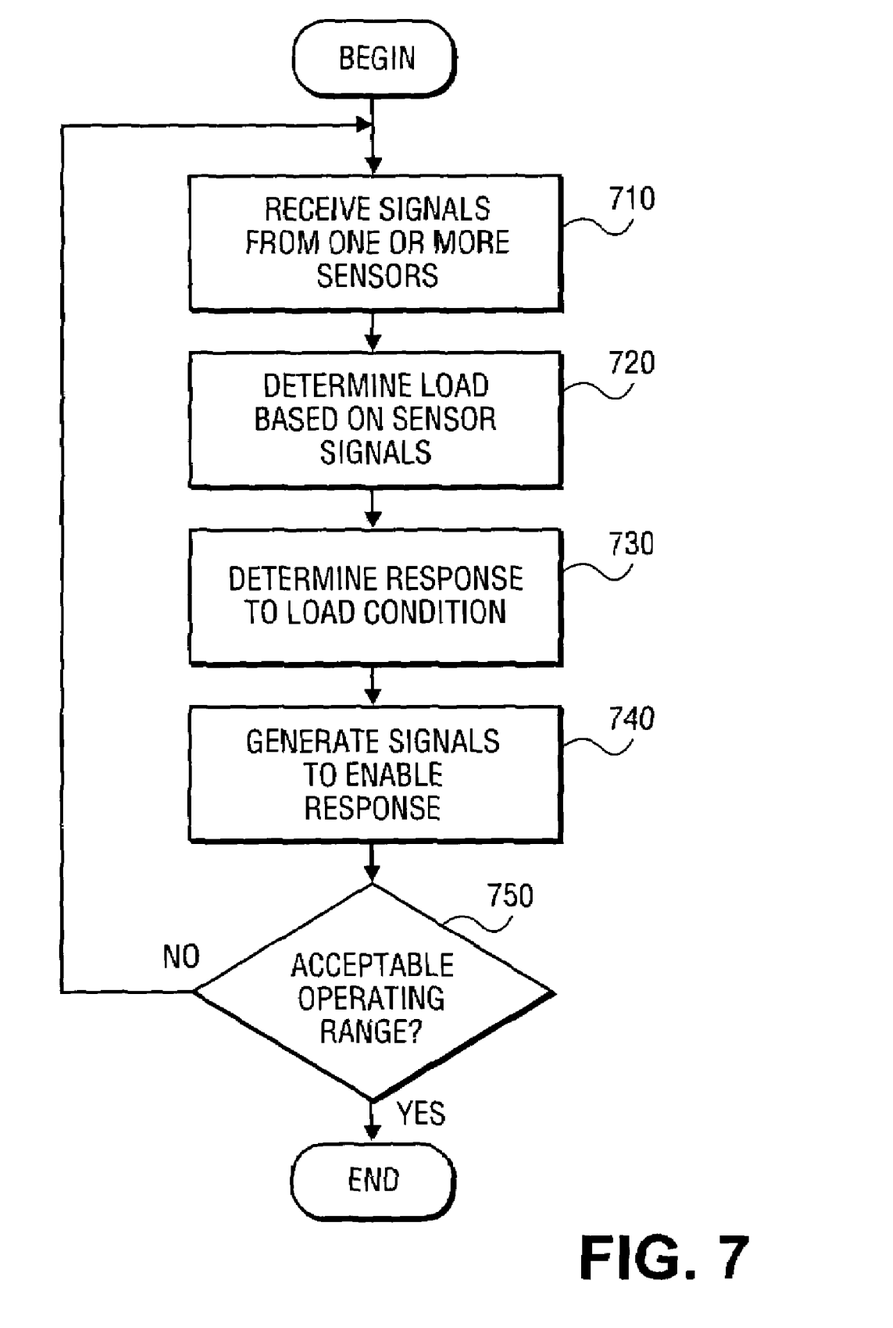
FIG. 7 is a flow diagram of one embodiment of control of wind turbine blade pitch in response to component displacement.

FIG. 7 is a flow diagram of one embodiment of control of wind turbine blade pitch in response to shaft radial displacement. Signals from one or more sensors are received, 710. The component receiving the signals (e.g., a processor, an analog-to-digital converter) is coupled with the sensors and converts the signals to a usable format, if necessary.

In response to the signals from the sensors, control circuitry (e.g., a processor, hardwired control circuits) determines the load on one or more wind turbine components using the signals from the sensors, 720. The control circuitry can use any mathematical equations known in the art to convert between the input data (e.g., magnitude of displacement) to relevant load data (e.g., forces exerted on a blade of the wind turbine).

The load on the rotor blades that caused the displacement as well as any asymmetrical properties of the load can also be determined by the control circuitry.

The control circuitry determines a response to the load condition, 730. For example, in response to an increased load on a blade of the turbine, the control circuitry can determine that the response should be to change the pitch of one or more of the blades of the wind turbine. As another example, the control circuitry can determine that the response should be to apply a brake to stop or slow rotation of the hub. As a further example the control circuitry can determine the response should be to exert some other action such as inducing a compensatory yaw adjustment.

The control circuitry generates the signal to enable the selected response, 740. For example, the control circuitry can generate a signal in the form of, for example, a data packet or a set of control signals transmitted over individual control lines, to cause a blade pitch controller to change the pitch of one or more blades. If the selected response fails to cause the wind turbine to operate within an acceptable operating range, 750, the process can be repeated as necessary or even discontinued, resulting in pitch control without the benefits of the described low-speed shaft feedback pitching control algorithm(s).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A wind turbine comprising:
   one or more proximity sensors facing a shaft to detect radial displacement of the shaft from a predetermined positions with respect to a relatively non-deflecting component; and
   a control circuit coupled with the one or more sensors to mitigate load causing the deflection on the one or more components in response to signals from the one or more sensors.

2. The wind turbine of claim 1 wherein the control circuits mitigates bending loads on the shaft by controlling pitch of one or more wind turbine blades.

3. The wind turbine of claim 1 wherein the one or more components comprise a main shaft of the wind turbine.

4. The wind turbine of claim 1 wherein the set of sensors comprises two proximity sensors facing the shaft, and further wherein the two sensors are approximately 90° apart with respect to the axis of the shaft.

5. The wind turbine of claim 1 wherein the set of sensors comprises four proximity sensors facing the shaft, and further wherein the four sensors are approximately 90° apart with respect to the axis of the shaft.

6. The wind turbine of claim 1 wherein the set of sensors comprises two pairs of proximity sensors facing the shaft, and further wherein the two pairs of sensors are approximately 90° apart with respect to the axis of the shaft.

7. A wind turbine comprising:
   means for detecting radial displacement of a shaft of the wind turbine based on output signals from one or more proximity sensors; and
   means for mitigating a load causing the displacement of the shaft in response to the detected shaft displacement.

8. The wind turbine of claim 7 wherein the means for mitigating the load compromises means for controlling pitch of one or more blades.

9. The wind turbine of claim 7 wherein the shaft comprises a main shaft.

10. A method comprising:
    receiving signals from one or more proximity sensors facing a shaft indicating radial displacement of the shaft of a wind turbine;
    determining a load placed on the wind turbine based on the signals from the one or more sensors; and
    causing one or more blades of the wind turbine to change pitch based on the determined load.

11. The method of claim 10 wherein the shaft comprises a main shaft.

12. The method of claim 10 wherein the one or more sensors detect radial displacement of the shaft from an at rest position.

13. The method of claim 10 wherein the set of sensors comprises two proximity sensors facing the shaft, and further wherein the two sensors are approximately 90° apart with respect to the axis of the shaft.

14. The method of claim 10 wherein the set of sensors comprises four proximity sensors facing the shaft, and further wherein the four sensors are approximately 90° apart with respect to the axis of the shaft.

15. The method of claim 10 wherein the set of sensors comprises two pairs of proximity sensors facing the shaft, and further wherein the two pairs of sensors are approximately 90° apart with respect to the axis of the shaft.

16. An article comprising an electronically-readable medium having stored thereon instructions that when executed, cause one or more processors to:
    receive signals from one or more proximity sensors connected to a shaft indicating radial displacement of the shaft of a wind turbine;
    determine a load placed on the wind turbine based on the signals from the one or more sensors; and
    cause one or more blades of the wind turbine to change pitch based on the determined load.

17. The article of claim 16 wherein the shaft comprises a main shaft.

18. The article of claim 16 wherein the one or more sensors detect radial displacement of the shaft from an at rest position.

19. The article of claim 16 wherein the set of sensors comprises two proximity sensors facing the shaft, and fur ther wherein the two sensors are approximately 90° apart with respect to the axis of the shaft.

20. The article of claim 16 wherein the set of sensors comprises four proximity sensors facing the shaft, and further wherein the four sensors are approximately 90° apart with respect to the axis of the shaft.

21. The article of claim 16 wherein the set of sensors comprises two pairs of proximity sensors facing the shaft, and further wherein the two pairs of sensors are approximately 90° apart with respect to the axis of the shaft.

* * * * *

UNITED STATES PATENT AND TRADEMARK OFFICE
CERTIFICATE OF CORRECTION

| | | |
|---|---|---|
| PATENT NO. | : 7,004,724 B2 | Page 1 of 1 |
| APPLICATION NO. | : 10/620485 | |
| DATED | : February 28, 2006 | |
| INVENTOR(S) | : Kirk G. Pierce, David Lawrence LeMieux and Ralph W. Blakemore | |

It is certified that error appears in the above-identified patent and that said Letters Patent is hereby corrected as shown below:

Please add this paragraph on column 1, line 4

Government Interest

This Invention was made with Government support under NREL Subcontract No. ZAM-7-13320-26, Prime Contract DE-AC36-83CH10093 awarded by the Department of Energy. The Government has certain rights in this invention.

Signed and Sealed this

Twenty-fourth Day of April, 2007

JON W. DUDAS
*Director of the United States Patent and Trademark Office*